United States Patent [19]

Suzuki

[11] Patent Number: 4,642,265

[45] Date of Patent: Feb. 10, 1987

[54] COATING MATERIAL FOR OPTICAL COMMUNICATION GLASS FIBERS AND FIBERS MADE THEREFROM

[75] Inventor: Toshio Suzuki, Ichihara, Japan

[73] Assignee: Toray Silicone Co., Ltd., Tokyo, Japan

[21] Appl. No.: 493,454

[22] Filed: May 11, 1983

[30] Foreign Application Priority Data

May 11, 1982 [JP] Japan ............... 57-78702

[51] Int. Cl.$^4$ ............................................. D02G 3/00
[52] U.S. Cl. ..................................... 428/375; 428/378;
428/391; 428/392; 350/96.29; 350/96.34;
528/15; 528/31; 528/32; 524/408
[58] Field of Search ............ 428/375, 378, 391, 392;
350/96.34, 96.29; 528/15, 31, 32; 524/408

[56] References Cited

U.S. PATENT DOCUMENTS

| | | | |
|---|---|---|---|
| 3,188,299 | 6/1965 | Chalk | 260/46.5 |
| 3,192,181 | 6/1965 | Moore | 260/46.5 |
| 3,445,420 | 5/1969 | Kookootsedes et al. | 260/37 |
| 3,723,567 | 3/1973 | Mink et al. | 260/825 |
| 4,260,726 | 4/1981 | Deubzer et al. | 528/15 |
| 4,374,967 | 2/1983 | Brown et al. | 528/15 |
| 4,380,367 | 4/1983 | Suzuki | 350/96.29 |

*Primary Examiner*—George F. Lesmes
*Assistant Examiner*—S. A. Gibson
*Attorney, Agent, or Firm*—Roger H. Borrousch

[57] ABSTRACT

A silicone coating material of a vinyl containing polyorganosiloxane, a polyorganohydrogensiloxane, a platinum catalyst, and an amorphous silica powder with a primary particle size of less than 0.2 μm is used to make optical communication glass fiber which has a cross-sectional structure of glass fiber core, a layer of the cured silicone coating material, and the exterior of the silicone coating material being covered with a thermoplastic resin material. The optical communication glass fiber made in this manner has a peelable coating such that the silicone coating material can be stripped from the glass fiber core.

11 Claims, 1 Drawing Figure

COATING MATERIAL FOR OPTICAL COMMUNICATION GLASS FIBERS AND FIBERS MADE THEREFROM

BACKGROUND OF THE INVENTION

1. Field of the Invention

This invention relates to silicone coating materials for optical communication glass fibers. More precisely, this invention concerns silicone coating materials 2 for optical communication glass fibers which have a cross-sectional structure in which a glass fiber 1 core is covered with a silicone coating material 2 and the exterior of the silicone coating material is covered with a thermoplastic resin coating material 3.

2. Description of the Prior Art

Optical communication glass fibers are currently being used in many communication systems such as public communications, in-house communications, computer datalinks and cable television because they are light weight and exhibit large transmission capacities, long-distance transmission abilities and electric insulation properties. The glass fibers which are normally used for optical communications are very fine fibers with a diameter of approximately 100 microns. Because the strength is significantly reduced and the transmission characteristics are impaired when the surface is contaminated, the surface is generally protected with a plastic or metal film. In addition, the transmission characteristics of optical communication glass fibers are significantly impaired when the fibers are slightly bent (microbending loss). Therefore, optical communication glass fibers are normally coated with a resin with a relatively low Young's modulus such as a silicone resin, urethane resin, ethylene-vinyl acetate resin, or epoxy acrylate resin as the primary coat and then with a resin with a relatively high Young's modulus such as nylon, polyethylene, or poly(vinyl chloride) as the secondary coat.

Fusion connection or butt connection is applicable for the connection of optical communication glass fibers. In both cases, it is readily understood that connection is preferably carried out after the primary and secondary coats have been completely removed. In particular for fusion connection, residual coating material is burned during the fusion operation and the combusted material enters the glass in the fused section which causes a significant decline in strength.

Because silicone primary coating materials exhibit an excellent adhesiveness for glass and a low Young's modulus, they have been widely utilized. In contrast, they are difficult to remove in the connection operation, i.e., the peelability is poor. Thus, it is a drawback that the silicone adhered on the glass fiber surface is not easily removed. This drawback is amplified by the further increase in adhesion when the thermoplastic resin is coated over the silicone coating material.

An object of this invention is a silicone coating material which does not suffer the drawbacks of conventional silicone coating materials, i.e., they have an excellent peelability, while retaining the merits of the conventional silicone coating materials.

SUMMARY OF THE INVENTION

This invention relates to a silicone coating material for making an optical communication glass fiber having a cross-sectional structure comprising a glass fiber core covered with cured silicone coating material and the exterior of the silicone coating material covered with a thermoplastic resin coating material comprising the product obtained by mixing (a) a polyorganosiloxane represented by the average unit formula $R_aSiO_{4-a/2}$ wherein each R represents a monovalent hydrocarbon radical or a halogenated monovalent hydrocarbon radical where at least 60 mol % of the radicals represented by R are methyl radicals and a has an average value in the range of 1.8 to 2.2, said polyorganosiloxane having at least two vinyl radicals per molecule, (b) a polyorganohydrogensiloxane represented by the average unit formula $R_b'SiO_{4-b/2}$ wherein each R' represents a hydrogen atom, a monovalent hydrocarbon radical, or a halogenated monovalent hydrocarbon radical where at least 40 mol % of the radicals represented by R' are methyl radicals and b has an average value in the range of 1.8 to 2.5, said polyorganohydrogensiloxane having at least two silicon-bonded hydrogen atoms per molecule and said polyorganohydrogensiloxane being present in an amount sufficient to give a molar ratio of silicon-bonded hydrogen atoms per vinyl radical in (a) of from 0.8/1 to 10/1, (c) platinum or a platinum compound at 0.1 to 100 ppm as platinum metal based on the total weight of (a) and (b), and (d) amorphous silica powder having an average primary particle size of no more than 0.2 μm, said silica powder being present in an amount of from 1 to 50 parts by weight per 100 parts by weight of the total weight of both (a) and (b).

Figure 1:
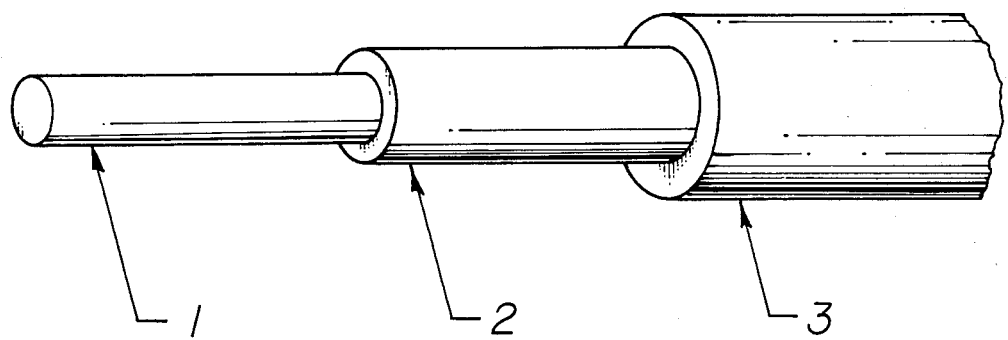
FIG. 1 contains an example of the cross-sectional structure of an optical communication fiber coated with the silicone coating material of this invention.

1. Optical communication glass fiber
2. Silicone coating material
3. Thermoplastic resin coating material

DESCRIPTION OF THE INVENTION

Component (a) is the primary component of the silicone coating material of this invention. In the presence of component (c) as the catalyst, component (a) undergoes film formation by addition crosslinking with component (b). It is essential that at least two vinyl groups be present per molecule of this component. The vinyl groups can be bonded at the ends of the polymer or as side chains. These vinyl groups may be directly bonded to silicon but are not necessarily directly bonded to silicon. If the economics are taken into consideration, the vinyl groups are preferably directly bonded to silicon. This component may have a linear, branched chain, network, three-dimensional, or cyclic molecular structure. Because a has a value from 1.8 to 2.2, the major molecular structure is mostly linear. From the standpoint of coating processability, a is preferably 1.95 to 2.05 and it is desirable that the majority of the molecules be linear. The molecular weight of this component is not particularly critical. Considering the coating processability, an appropriate viscosity at 25° C. ranges from 10 to 10,000 cp and preferably from 100 to 5,000 cp. Examples of the monovalent organic radicals R are as follows: alkyl radicals such as methyl, ethyl, propyl, and isopropyl; alkenyl radicals such as vinyl, allyl, and butenyl; halogenated alkyl radicals such as chloromethyl and flouropropyl; aryl radicals such as phenyl, benzyl, and tolyl, and cycloalkyl radicals such as cyclohexyl and cyclopentyl. 60 mol % or more of R in (a) are methyl from a consideration of peelability. In order to achieve a satisfactory peelability and coating processability, the proportion of methyl radicals in (a) is preferably 90 mol % or greater. In addition, this component can contain small amounts of silicon-bonded hydroxyl groups and alkoxy groups. Examples of this component are as follows:
dimethylvinylsilyl-terminated polydimethylsiloxane,
dimethylvinylsilyl-terminated dimethylsiloxane-diphenylsiloxane copolymer,
dimethylvinylsilyl-terminated dimethylsiloxane-methylphenylsiloxane copolymer,
trimethylsilyl-terminated dimethylsiloxane-methylvinylsiloxane copolymer,
dimethylvinylsilyl-terminated dimethylsiloxane-methylvinylsiloxane copolymer,
dimethylvinylsilyl-terminated dimethylsiloxane-diphenylsiloxane-methylphenylsiloxane copolymer,
compounds in which the terminal groups of the above-mentioned polymers are methylphenylvinylsilyl groups, and copolymers consisting of at least three types of units selected from among $(CH_3)_3SiO_{\frac{1}{2}}$ units, $(CH_3)_2SiO$ units, $CH_3SiO_{3/2}$ units, $CH_3(CH_2=CH)SiO$ units, $(CH_3)_2(CH_2=CH)SiO_{\frac{1}{2}}$ units, $CH_3(C_6H_5)SiO$ units, and $(C_6H_5)_2SiO$ units.

Component (b) is a crosslinking agent for component (a). The hydrogen atoms directly bonded to silicon in component (b) carry out a crosslinking reaction by addition to the vinyl radicals of component (a) in the presence of the catalytic action provided by component (c). It is essential that at least two hydrogen atoms directly bonded to silicon be present per molecule of this component. In order to carry out a satisfactory crosslinking reaction, three or more hydrogen atoms are directly bonded to silicon per molecule of this component. This component may have a linear branched chain, cyclic, network, or three-dimensional molecular structure. Because b has a value of 1.8 to 2.5, linear, branched chain, or cyclic structures are the primary molecular structures. In order to obtain satisfactory compatibility with component (a), b is preferably 1.95 to 2.40 and a majority of the molecular structures are preferable linear or cyclic structures. The molecular weight of this component is not particularly critical. However, molecules with a viscosity ranging from 1 to 100 cp at 25° C. can be used. In order to obtain a satisfactory processability, molecules with a viscosity ranging from 1 to 100 cp are preferred. Examples of the monovalent organic radicals R' are as follows: alkyl radicals such as methyl, ethyl, and propyl; halogenated alkyl radicals such as chloromethyl and fluoropropyl; and aryl radicals such as phenyl, benyl, and tolyl. The proportion of methyl radicals in (b) is 40 mol % or more. In order to obtain a satisfactory peelability and coating processability, the proportion of methyl in R' radicals is preferably 90 mol % or more. Moreover, this component can contain small amounts of silicon-bonded hydroxyl groups or alkoxy groups. The amount of (b) is such that the molar ratio of silicon-bonded hydrogen atoms per vinyl radical in (a) is from 0.8/1 to 10/1. If the molar ratio is less than 0.8/1, the crosslinking reaction does not proceed satisfactorily. It is essentially meaningless for the molar ratio to exceed 10/1 and the cured product is too hard. Examples of this component are as follows:
trimethylsilyl-terminated methylhydrogenpolysiloxane,
trimethylsilyl-terminated dimethylsiloxane-methylhydrogensiloxane copolymer,
methylhydrogensiloxane cyclic polymer,
dimethylsiloxane-methylhydrogensiloxane cyclic copolymer,
trimethylsilyl-terminated dimethylsiloxane-methylhydrogensiloxane-diphenylsiloxane copolymer,
dimethylphenylsilyl-terminated methylphenylsiloxane-methylhydrogensiloxane copolymer.

Component (c) is a catalyst for the crosslinking reaction between component (a) and component (b). The following substances are applicable examples: powdered platinum, powdered platinum adsorbed on a support, platinum black, chloroplatinic acid, chloroplatinate alkali metal salts, platinum tetrachloride, alcohol-modified chloroplatinate, chloroplatinate-olefin complexes, chloroplatinate-alkenylsiloxane complexes and diketone chelates of platinum. This component is added at 0.1 to 1000 ppm as platinum metal based on the total weight of components (a) and (b). If this amount is less than 1 ppm, curing is very slow. On the other hand, exceeding 1000 ppm is essentially meaningless and also uneconomical. An appropriate amount of addition ranges from 1 to 100 ppm.

Component (d) is the most important component of this invention. It plays the role of remarkably improving the peelability from a glass fiber coated of a silicone primary coating material which has been secondarily coated with a thermoplastic resin. This component is an amorphous silica powder with an average primary particle size of 0.2 μm, (200 millimicrons) or less. The reason why the average primary particle size is specified at 0.2 μm or less is as follows. If the average primary particle size exceeds 0.2 μm, microbending loss by the optical communication glass fiber may occur. Crystalline silica powders may scratch the glass fiber surface. In addition, the peelability cannot be improved as much using crystalline silica powder. The silica powder used as this component may be selected from among those with a primary particle structure or those with a secondary particle structure. Examples are synthetic silicas prepared by the dry process (gas phase oxidation) and by the wet process (precipitation), silica flower, and natural amorphous silicas. The $SiO_2$ content in this component is preferably 90 percent or greater. Moreover, an $SiO_2$ content of 95 percent or greater is desirable for achieving the purpose of this invention. For the purpose of protecting the surface of optical communication glass fibers, the alkali metal content is kept low and a desirable level is 100 ppm or less. In order to prevent foaming in the cured product, the water content of the silica powder is preferably 1 wt % or less. Silanol groups are normally present on the surface of a silica powder. In this invention, a silica powder with silanol groups can be used directly. Alternatively, a silica powder may be used in which the surface silanol groups have been treated with hexamethyldisilazane, methyltrimethoxysilane, or a low molecular weight polydimethylsiloxane. Considering the requirement of an adequate flowability for coating, the latter silica powder may be advantageously used.

The amount of (d) can be from 1 to 50 parts by weight per 100 parts by weight of the total weight of both components (a) and (b). If the amount of addition is less than 1 part by weight, an improvement in peelability hardly appears. If it exceeds 50 parts by weight, the viscosity of the composition becomes so high that the coating process is difficult to complete. In terms of the improvement is peelability, this component is added preferably at 5 parts by weight or more. In terms of the coating processability, this component is preferably added at 30 parts by weight or less, therefore the preferred amount of (d) is from 5 to 30 parts by weight.

The silicone coating material of this invention can be obtained very easily by simply mixing the four components (a), (b), (c), and (d). As the mixer, systems which are ordinarily used in this field are all applicable such as a planetary mixer, kneader mixer, and Banbury mixer.

In order to extend the pot life, a small amount of a curing retardant (also known by the term "platinum catalyst inhibitor") such as a triazole, amine, acetylene alcohol, or ethynyl group-containing silane is preferable added to the silicone coating material of this invention.

If desirable, a vinyl group-containing silicone resin may be added for reinforcement and other additives may also be used such as ultrafine colorants, thermal stabilizers, and flame retardants.

Because the silicone coating material of this invention contains a specified silica powder, a satisfactory peelability is exhibited when the silicone coating material is applied on an optical communication fiber with a cross-sectional structure in which a glass fiber 1 core is coated with a silicone coating material 2 and the exterior of the silicone coating material 2 is coated with a thermoplastic resin coating material 3. For purposes of this invention the term glass fiber core will also include those glass fiber cores which have cladding as well as those which do not have cladding. As a result, the glass fiber connection operation becomes quite easy. when the outer thermoplastic resin coating material layer 3 and the inner silicone coating material 2 are cut and the thermoplastic resin coating material 3 is pulled off the glass fiber 1, both the inner silicone coating material 2 and thermoplastic resin coating material 3 can be removed. This is the characteristic point of this invention. Considering that the peelability from a glass fiber was not improved when the glass fiber was primarily coated with only the silicone coating material of this invention, the above-mentioned phenomenon is absolutely an unexpected effect.

Optical communication glass fibers coated with the silicone coating material of this invention exhibit excellent connectability and are therefore very useful in a variety of industrial fields in public communications, inhouse communications, cable television, and computer datalinks.

The silicone coating material of this invention is coated over a glass fiber by conventional methods. That is, the use of a coating die, the combination of an extruder with a coating die and the combination of a gear pump with a coating die are applicable. The silicone coating material is preferably cured by heating immediately after coating. In this case, an appropriate curing temperature ranges from 100° to 800° C.

The thermoplastic resins used for coating the exterior of the silicone coating material of this invention may be selected from among conventional thermoplastic resins. Examples are polyamides, polyethylenes, polypropylenes, polyesters, polysulfones, poly(vinyl chloride)s, poly(phenylene oxide)s, poly(phenylene sulfide)s, fluorine resins, and methacrylic resins.

This invention produces optical communication glass fiber which have a cross-sectional structure of a glass fiber core covered with a peelable silicone coating layer obtained by curing a layer of a silicone coating material obtained by mixing (a) a polyorganosiloxane represented by the average unit formula $R_aSiO_{4-a/2}$ wherein each R represents a monovalent hydrocarbon radical or a halogenated monovalent hydrocarbon radical where at least 60 mol % of the radicals represented by R are methyl radicals and a has an average value in the range of 1.8 to 2.2, said polyorganosiloxane having at least two vinyl radicals per molecule, (b) a polyorganohydrogensiloxane represented by the average unit formula $R_b'SiO_{4-b/2}$ wherein each R' represents a hydrogen atom, a monovalent hydrocarbon radical, or a halogenated monovalent hydrocarbon radical where at least 40 mol % of the radicals represented by R' are methyl radicals and b has an average value in the range of 1.8 to 2.5, said polyorganohydrogensiloxane having at least two silicon-bonded hydrogen atoms per molecule and said polyorganohydrogensiloxane being present in an amount sufficient to give a molar ratio of silicon-bonded hydrogen atoms per vinyl radical in (a) of from 0.8/1 to 10/1, (c) platinum or a platinum compound at 0.1 to 100 ppm as platinum metal based on the total weight of (a) and (b), and (d) amorphous silica powder having an average primary particle size of no more than 0.2 μm, said silica powder being present in an amount of from 1 to 50 parts by weight per 100 parts by weight of the total weight of both (a) and (b), said peelable silicone coating layer having its exterior covered with a thermoplastic resin coating material.

This invention will be explained in detail in the following examples. "Parts" in the examples denotes "parts by weight", and "%" denotes "% by weight". The viscosity was determined at 25° C.

EXAMPLE 1

A mixture consisting of 100 parts of a dimethylvinylsilyl-terminated polydimethylsiloxane (viscosity 2000 cp), 2 parts of a trimethylsilyl-terminated polysiloxane copolymer (dimethylsiloxane unit: methylhydrogensiloxane unit molar ratio—1:1, viscosity 10 cp), 0.1 part of a 1% 2-ethylhexanol solution chloroplatinic acid, 0.05 parts methylbutynol, and 8 parts of dry-process silica (average primary particle size 12 millimicrons, BET surface area 200 m$^2$/g) was prepared with a planetary mixer.

The mixture was coated with a coating die over an optical communication glass fiber (core diameter: 50 microns; clad diameter: 125 microns) to give an outer diameter of 450 microns. Immediately after coating, the coat was cured in an electric oven at 500° C. A polyamide (nylon 12) was coated over the exterior to give an outer diameter of 900 microns. The coated fibers were allowed to stand at room temperature for 24 hours.

Circular cuts were made with a knife in the nylon 12 layer and the silicone layer on the above-mentioned coated fibers. When pulled with a nipper, both the silicone coating material and the nylon 12 coating material were completely peeled from the glass fiber. As a comparison example, the same test was conducted without the addition of dry-process silica to the above-mentioned composition. Approximately 95% of the glass fiber surface was still covered with the silicone coating material.

EXAMPLE 2

A silicone resin (30 parts) consisting of $(CH_3)_3SiO_{\frac{1}{2}}$ units (8 mol %), $(CH_3)_2(CH_2=CH)SiO_{\frac{1}{2}}$ units (4 mol %) and $SiO_2$ units (88 mol %) was dissolved as a reinforcing silicone resin in 100 parts of a dimethylvinylsilyl-terminated polydimethylsiloxane (viscosity 1000 cp) and this solution was used as the base polymer. A mixture consisting of 120 parts of the above-mentioned base polymer, 2.5 parts 1,3,5,7-tetramethyl-1,3,5,7-tetrahydrogencyclotetrasiloxane, 0.1 part of a 1% 2-ethylhexanol solution of chloroplatinic acid, 0.05 parts methylbutynol, and 15 parts of dry-process silica (surface treated with hexamethyldisilazane, average primary particle size 7 millimicrons, BET surface area 300 M$^2$/g) was prepared with a planetary mixer. The above-mentioned mixture was coated over an optical communication glass fiber (core diameter: 50 microns; clad diameter: 125 microns) to give an outer diameter of 550 microns using a gear pump and coating die. The coat was cured immediately in an electric oven at 600° C. The exterior was then coated with poly(vinyl chloride) to give an outer diameter of 1.0 mm. Aging was continued at 70° C. for one week. Circular cuts were made in the poly(vinyl chloride) layer and the silicone layer in the above-mentioned coated fibers. When pulled with a nipper, both the silicone coating material and the poly(vinyl chloride) coating material were found to be completely peeled off from the glass fiber. As a comparison example, the same experiment was repeated except that the dry-process silica was not added to the above-mentioned mixture. As a result, approximately 30 percent of the glass surface was still covered with silicone.

EXAMPLE 3

A mixture consisting of 100 parts of a dimethylvinylsilyl-terminated polysiloxane copolymer(dimethylsiloxane unit: methylphenylsiloxane unit molar ratio=9:1, viscosity 1500 cp), 1.0 part of a trimethylsilyl-terminated polymethylhydrogensiloxane (viscosity 25 cp), 0.2 parts of a 1% isopropanol solution of chloroplatinic acid, 0.05 parts methylbutynol, and 20 parts precipitated silica (surface treated with hexamethyldisilazane, average primary particle size 20 millimicrons) was prepared with a planetary mixer. The mixture was coated with a gear pump and coating die over an optical communication glass fiber (core diameter: 100 microns; clad diameter: 150 microns) and cured in an electric oven at 300° C. The exterior was coated with high-density polyethylene. The coat was allowed to stand at room temperature for 48 hours. The above-mentioned coated fiber was peeled with a wire stripper (peeler) for optical communication glass fibers. Both the silicone coating material and the high-density polyethylene coating material were found to be completely peeled off from the fibers. As a comparison example, the same experiment was conducted except that the precipitated silica was not added to the above-mentioned mixture. Approximately 95% of the glass surface was still covered with silicone.

EXAMPLE 4

A mixture consisting of 100 parts of a dimethylvinylsilyl-terminated polydimethylsiloxane (viscosity 500 cp), 3.5 parts of a dimethylhydrogensilyl-terminated polysiloxane copolymer (dimethylsiloxane-to-methylhydrogensiloxane molar ratio—3/2, viscosity 8 cp), 0.2 parts of a 1% 2-ethylhexanol solution of chloroplatinic acid, and 0.01 part ethynylcyclohexanol was prepared (mixture A). Three types of silicone coating materials, B, C, and D as shown in Table 1 were prepared with a planetary mixer using mixture A. Each mixture was coated over an optical communication quartz fiber (core size: 50 microns; clad size: 125 microns) with a gear pump and coating die. The fiber was also coated with a polyamide (nylon 12). The coated fiber was allowed to stand at room temperature for 24 hours. The optical attenuation, tensile strength and peelability with a wire stripper were determined. The results are summarized in Table 2.

As shown by the results in Table 2, the use of a crystalline silica powder such as a pulverized quartz caused a reduction in fiber strength. Microbending loss occurred with the use of silica with a large particle size such as fused silica.

TABLE 1

Silicone Coating Material Compositions

| Component | B (this invention) | C (comparison example) | D (comparison example) |
|---|---|---|---|
| Mixture A | 100 parts | 100 parts | 100 parts |
| Dry-process silica described in Example 2 | 15 parts | — | — |
| Pulverized quartz with an average particle size of 1 micron | — | 15 parts | — |
| Fused silica (amorphous) with an average particle size of 10 microns | — | — | 15 parts |

TABLE 2

Test results

| Property | B (this invention) | C (comparison example) | D (comparison example) |
|---|---|---|---|
| Attenuation (db/km) | 0.8 | 3.5 | 710 |
| Tensile strength (kg/mm$^2$) | 480 | 150 | 350 |
| Silicone residue (percent), see note 1 | 0 | 20 | 30 |

Note 1:
% of glass fiber surface on which the silicone coating material remained That which is claimed is:

1. A silicone coating material for making an optical communication glass fiber having a cross-sectional structure comprising a glass fiber core covered with cured silicone coating material and the exterior of the silicone coating material covered with a thermoplastic resin coating material
   comprising the product obtained by mixing
   (a) a polyorganosiloxane represented by the average unit formula $R_aSiO_{4-a/2}$ wherein each R represents a monovalent hydrocarbon radical or a halogenated monovalent hydrocarbon radical where at least 60 mol % of the radicals represented by R are methyl radicals and a has an average value in the range of 1.8 to 2.2, said polyorganosiloxane having at least two vinyl radicals per molecule,
   (b) a polyorganohydrogensiloxane represented by the average unit formula $R_b'SiO_{4-b/2}$ wherein each R' represents a hydrogen atom, a monovalent hydrocarbon radical, or a halogenated monovalent hydrocarbon radical where at least 40 mol % of the radicals represented by R' are methyl radicals and b has an average value in the range of 1.8 to 2.5, said polyorganohydrogensiloxane having at least two silicon-bonded hydrogen atoms per molecule and said polyorganohydrogensiloxane being present in an amount sufficient to give a molar ratio of silicon-bonded hydrogen atoms per vinyl radical in (a) of from 0.8/1 to 10/1, (c) platinum or a platinum compound at 0.1 to 100 ppm as platinum metal based on the total weight of (a) and (b), and (d) amorphous silica powder having an average primary particle size of no more than 0.2 μm, said silica powder being present in an amount of from 1 to 50 parts by weight per 100 parts by weight of the total weight of both (a) and (b).

2. The silicone coating material according to claim 1 in which (a) is a polyorganosiloxane having at least 90 mole of the radical represented by R as methyl radicals.

3. The silicone coating material according to claim 1 in which (d) is an amorphous silica powder obtained by gas phase oxidation or by precipitation.

4. The silicone coating material according to claim 2 in which (d) is an amorphous silica powder obtained by gas phase oxidation or by precipitation.

5. The silicone coating material according to claim 1 in which (d) is present in an amount of from 5 to 30 parts by weight per 100 parts by weight of the total weight of both (a) and (b).

6. The silicone coating material according to claim 5 in which there is also present a platinum catalyst inhibitor.

7. The silicone coating material according to claim 2 in which (d) is present in an amount of from 5 to 30 parts by weight per 100 parts by weight of the total weight of both (a) and (b).

8. The silicone coating material according to claim 7 in which there is also present a platinum catalyst inhibitor.

9. An optical communication glass fiber comprising a cross-sectional structure of a glass fiber core covered with a peelable silicone coating layer obtained by curing a layer of a silicone coating material obtained by mixing (a) a polyorganosiloxane represented by the average unit formula $R_a SiO_{4-a/2}$ wherein each R represents a monovalent hydrocarbon radical or a halogenated monovalent hydrocarbon radical where at least 60 mol % of the radicals represented by R are methyl radicals and a has an average value in the range of 1.8 to 2.2, said polyorganosiloxane having at least two vinyl radicals per molecule, (b) a polyorganohydrogensiloxane represented by the average unit formula $R_b' SiO_{4-b/2}$ wherein each R' represents a hydrogen atom, a monovalent hydrocarbon radical, or a halogenated monovalent hydrocarbon radical where at least 40 mol % of the radicals represented by R' are methyl radicals and b has an average value in the range of 1.8 to 2.5, said polyorganohydrogensiloxane having at least two silicon-bonded hydrogen atoms per molecule and said polyorganohydrogensiloxane being present in an amount sufficient to give a molar ratio of silicon-bonded hydrogen atoms per vinyl radical in (a) of from 0.8/1 to 10/1, (c) platinum or a platinum compound at 0.1 to 100 ppm as platinum metal based on the total weight of (a) and (b), and (d) amorphous silica powder having an average primary particle size of no more than 0.2 μm, said silica powder being present in an amount of from 1 to 50 parts by weight per 100 parts by weight of the total weight of both (a) and (b), said peelable silicone coating layer having its exterior covered with a thermoplastic resin coating material.

10. The silicone coating material according to claim 7 in which the a in the average unit formula of the polyorganosiloxane of (a) has an average value in the range of 1.95 to 2.05, the monovalent hydrocarbon radicals of R are at least 90 mol % methyl radicals, and the viscosity of the polyorganosiloxane is in the range of from 10 to 10,000 cp; the b in the average unit formula of the polyorganohydrogensiloxane of (b) has an average value in the range of from 1.95 to 2.40, the monovalent hydrocarbon radicals of R' are at least 90 mol % methyl radicals, and the viscosity of the polyorganohydrogensiloxane is in the range of from 1 to 100 cp; and the amorphous silica powder of (d) has an $SiO_2$ content of at least 90%; the alkali metal content is 100 ppm or less, and the water content is 1 wt % or less.

11. The silicone coating material according to claim 10 in which there is also present a platinum catalyst inhibitor.

* * * * *